US009865208B2

(12) United States Patent
Cho et al.

(10) Patent No.: US 9,865,208 B2
(45) Date of Patent: Jan. 9, 2018

(54) LIQUID CRYSTAL DISPLAY DEVICE AND METHOD OF DRIVING THE SAME

(71) Applicant: SAMSUNG DISPLAY CO., LTD., Yongin-si, Gyeonggi-Do (KR)

(72) Inventors: Eui Myeong Cho, Yongin-si (KR); Jang Hoon Kwak, Yongin-si (KR); Yun Mi Kim, Yongin-si (KR); Eun Kyung Kim, Yongin-si (KR); Hee Jeong Seo, Yongin-si (KR); Ki Hyun Pyun, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 27 days.

(21) Appl. No.: 15/189,529

(22) Filed: Jun. 22, 2016

(65) Prior Publication Data

US 2017/0011694 A1 Jan. 12, 2017

(30) Foreign Application Priority Data

Jul. 6, 2015 (KR) ........................ 10-2015-0095965

(51) Int. Cl.

| | |
|---|---|
| ***G06F 3/038*** | (2013.01) |
| ***G09G 5/00*** | (2006.01) |
| ***G09G 3/36*** | (2006.01) |

(52) U.S. Cl.

CPC ......... *G09G 3/3614* (2013.01); *G09G 3/3677* (2013.01); *G09G 2310/0202* (2013.01); *G09G 2310/0245* (2013.01); *G09G 2310/04* (2013.01); *G09G 2310/061* (2013.01); *G09G 2340/0442* (2013.01)

(58) Field of Classification Search

CPC ... G09G 2310/0202; G09G 2310/0245; G09G 2310/04; G09G 2310/061; G09G 2340/0442; G09G 3/3614; G09G 3/3677

See application file for complete search history.

(56) References Cited

U.S. PATENT DOCUMENTS

| | | | | |
|---|---|---|---|---|
| 9,099,938 | B2 | 8/2015 | Ilic et al. | |
| 2002/0126114 | A1* | 9/2002 | Yatabe .................. | G09G 3/367 345/212 |
| 2003/0052842 | A1* | 3/2003 | Yoshida ............... | G09G 3/3216 345/76 |
| 2009/0219238 | A1 | 9/2009 | Furuya et al. | |

FOREIGN PATENT DOCUMENTS

| | | |
|---|---|---|
| KR | 10-2009-0131844 | 12/2009 |
| KR | 10-2014-0019528 | 2/2014 |
| KR | 10-2015-0002250 | 1/2015 |
| KR | 10-2015-0003796 | 1/2015 |

* cited by examiner

*Primary Examiner* — Insa Sadio

(74) *Attorney, Agent, or Firm* — F. Chau & Associates, LLC

(57) ABSTRACT

A liquid crystal display device is provided as follows. A display panel having a first aspect ratio includes pixels, scan lines and data lines. The pixels are arranged at intersections of the scanning lines and the data lines. A display panel driver, in a partial mode in which an image having a second aspect ratio different from the first aspect ratio is displayed on a partial region of the display panel for two or more frame periods, supplies scan signals only to a first number of scan lines electrically connected to pixels of the partial region for a first type frame period of the two or more frame periods, and supplies scan signals to the plurality of scan lines for a second type frame period of the two or more frame periods.

11 Claims, 7 Drawing Sheets

LIQUID CRYSTAL DISPLAY DEVICE AND METHOD OF DRIVING THE SAME

CROSS-REFERENCE TO RELATED APPLICATION

This application claims priority under 35 U.S.C. §119 to Korean Patent Application No. 10-2015-0095965, filed on Jul. 6, 2015 in the Korean Intellectual Property Office, the disclosure of which is incorporated by reference herein in its entirety.

TECHNICAL FIELD

The present invention relates to a liquid crystal display device and a method of driving the same.

DISCUSSION OF RELATED ART

Various display devices including a liquid crystal display device, a field emission display device, a plasma display panel device, or an organic light emitting display device have been developed. Depending on their usage, the display devices have different aspect ratio which represents the width-to-height of the display panel of the display devices. Computer monitors may have an aspect ratio of 4:3; High Definition television may have an aspect ratio of 16:9; Widescreen computer monitors may have 16:10; Mobile phones may have an aspect ratio of 4:3.

SUMMARY

According to an exemplary embodiment of the present invention, a liquid crystal display device is provided as follows. A display panel having a first aspect ratio includes a plurality of pixels, a plurality of scan lines and a plurality of data lines. The pixels are arranged at intersections of the scanning lines and the data lines. A display panel driver, in a partial mode in which an image having a second aspect ratio different from the first aspect ratio is displayed on a partial region of the display panel for two or more frame periods, supplies scan signals only to a first number of scan lines electrically connected to pixels of the partial region for a first type frame period of the two or more frame periods, and supplies scan signals to the plurality of scan lines for a second type frame period of the two or more frame periods.

According to an exemplary embodiment of the present inventive concept, a method of driving a liquid crystal display device including a display panel including a plurality of pixels, a plurality of scan lines and a plurality of data lines electrically connected to the pixels is provided as follows. An image to be displayed is determined whether an aspect ratio of the image is different from an aspect ratio of the display panel. If the aspect ratio of the image is determined as different from that of the display panel, the image is displayed in a partial mode where scan signals are supplied only to scan lines of a partial region in the display panel for a first type frame period and scan signals are supplied to the plurality of scan lines for a second type frame period. If the aspect ratio of the image is determined as the same as that of the display panel, the image is displayed in a full screen mode where scan signals are supplied to the plurality of scan lines.

BRIEF DESCRIPTION OF DRAWINGS

These and other features of the present invention will become more apparent by describing in detail exemplary embodiments thereof with reference to the accompanying drawings of which.

DETAILED DESCRIPTION OF EXEMPLARY EMBODIMENTS

Figure 1:
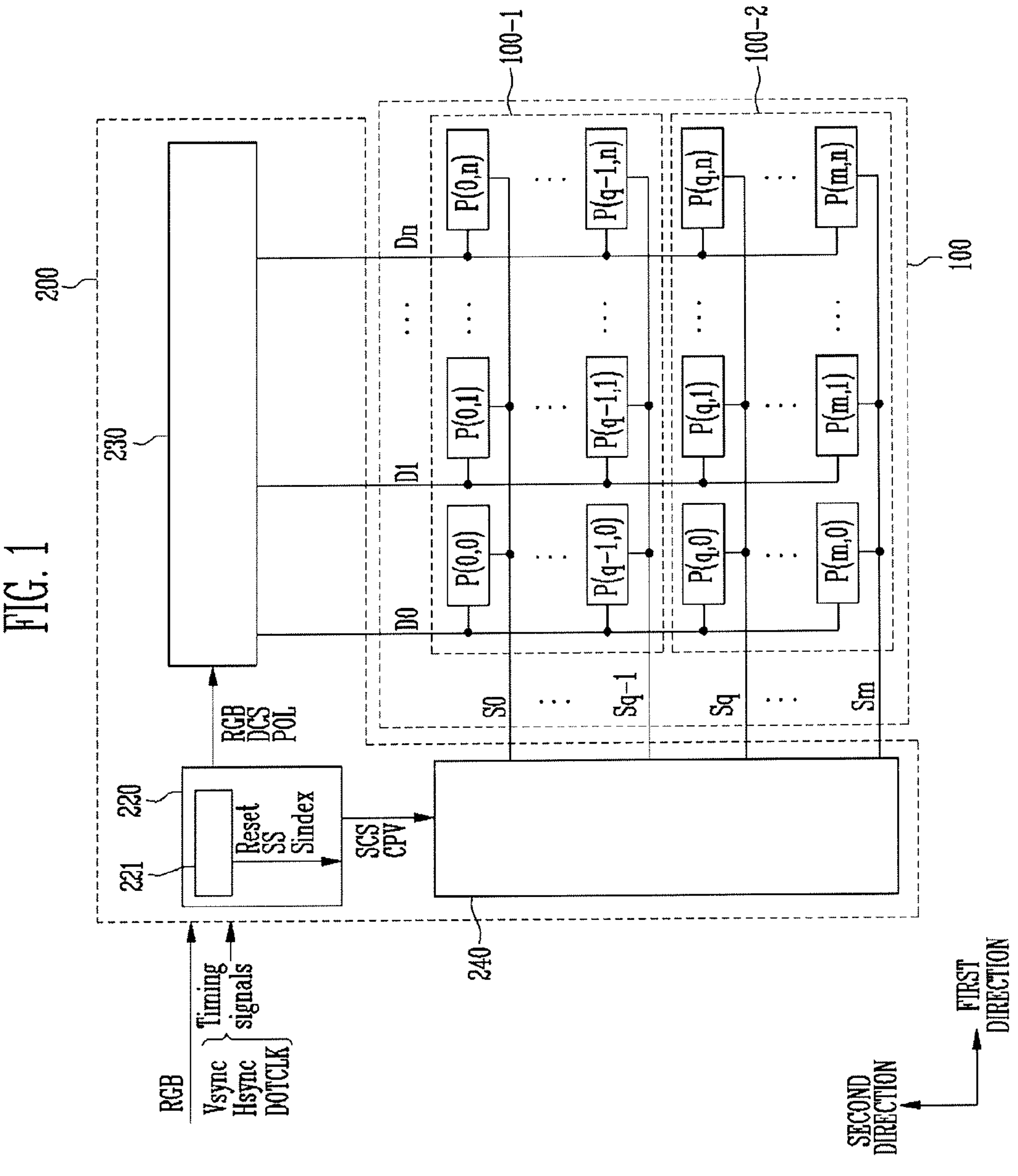
FIG. 1 shows a liquid crystal display device according to an exemplary embodiment of the present invention.

Exemplary embodiments of the present invention will be described below in detail with reference to the accompanying drawings. However, the present invention may be embodied in different forms and should not be construed as limited to the embodiments set forth herein. In the drawings, the thickness of layers and regions may be exaggerated for clarity. It will also be understood that when an element is referred to as being "on" another element or substrate, it may be directly on the other element or substrate, or intervening layers may also be present. It will also be understood that when an element is referred to as being "coupled to" or "connected to" another element, it may be directly coupled to or connected to the other element, or intervening elements may also be present. Like reference numerals may refer to the like elements throughout the specification and drawings.

FIG. 1 shows a liquid crystal display device according to an exemplary embodiment of the present invention. The liquid crystal display device includes a display panel 100 and a display panel driver 200.

The display panel 100 includes pixels P(0,0) to P(m,n) (m and n are positive integers), data lines D0 to Dn (hereinafter, referred to as D) extending in a second direction, for transmitting data voltages to the pixels P(0,0) to P(m,n) (hereinafter, referred to as P), and scan lines S0 to Sm (hereinafter, referred to as S) extending in a first direction, for transmitting scan signals to the pixels P. The number of pixels P arranged in the first direction is (n+1), and the number of pixels P arranged in the second direction is (m+1). The scan lines S extend in the first direction and the data lines D extend in the second direction that intersects the first direction. However, the present invention is not limited thereto. In FIG. 1, the pixel P(m,n) is electrically connected to the scan line Sm and the data line Dn. However, the present invention is not limited thereto.

The display panel 100 may include a first region 100-1 and a second region 100-2. If an aspect ratio of a displayed image is different from that of the display panel 100, the image is displayed only in the first region 100-1 without being displayed in the second region 100-2. At this time, a region in which the image is displayed is the first region 100-1 and a partial region in which the image is not displayed is the second region 100-2. The scan lines S include scan lines S0 to Sq−1 (q is an integer of no less than 0 and no more than m) which serves to display an image in the first region 100-1 and scan lines Sq to Sm which serves to display an image in the second region 100-2. In an exemplary embodiment described with reference to FIG. 1, the partial region in which the image is not displayed is arranged only under the region in which the image is displayed. However, the present invention is not limited thereto. The partial region in which the image is not displayed may be arranged only on the region in which the image is displayed or on and under the region in which the image is displayed.

The display panel driver 200 drives the display panel 100 by generating the data voltages and supplying the generated data voltages to the data lines D and by generating scan signals and supplying the generated scan signals to the scan lines S0 to Sm. For example, the display panel driver 200 includes a timing controller 220, a data driver 230, and a scan driver 240. The timing controller 220, the data driver 230, and the scan driver 240 may be individually implemented by electronic devices or the entire display panel driver 200 may be implemented by one electronic device (for example, a display driving integrated circuit (IC), etc.). When the image is not displayed in the second region 100-2 of the display panel 100 in two or more frame periods, the display panel driver 200 supplies the scan signals only to the scan lines S0 to Sq−1 which serves to display the image in a partial region within the display panel 100 for some of the two or more frame periods and supplies the scan signals to the scan lines S0 to Sm in the other of the two or more frame periods. The aspect ratio of the displayed image may be determined by an external signal (not shown, for example, a remote controller signal or a touch) and q may be also changed by the external signal. Detailed contents of the some frame periods (which may be referred to as a first type frame period) and the other frame periods (which may be referred to as a second type frame period) will be described in more detail later with reference to FIGS. 3 to 5.

The timing controller 220 receives image signals RGB and timing signals from the outside. The timing signals may include a vertical synchronizing signal Vsync, a horizontal synchronizing signal Hsync, and a dot clock DOTCLK. The timing controller 220 may transmit the image signals RGB to the data driver 230. The timing controller 220 generates timing control signals for operating the data driver 230 and the scan driver 240. The timing control signals include a scan timing control signal SCS supplied to the scan driver 240 to control operation timing of the scan driver 240 and a data timing control signal DCS supplied to the data driver 230 to control operation timing of the data driver 230. The scan timing control signal SCS includes a gate start pulse and one or more gate shift clocks. The gate start pulse controls timing of a first scan signal being supplied to one of the scan lines S. The gate shift clocks refer to one or more clock signals for shifting the gate start pulse.

In addition, the timing controller 220 generates a polarity signal POL and supplies the generated polarity signal POL to the data driver 230. A logic value of the polarity signal POL need not change in each frame period (a frame inversion method). However, the present invention is not limited thereto. For example, the logic value of the polarity signal POL may change in each frame period (a column inversion method and a dot inversion method, etc.).

The timing controller 220 may generate a scan driver control signal CPV. Scan lines corresponding to a scan driver control signal CPV having a first logic value may receive scan signals and scan lines corresponding to a scan driver control signal CPV having a second logic value different from the first logic value does not receive scan signals. For example, the scan driver 240 may include a plurality of switches connected to the scan lines S0 to Sm, and the switches, in response to the scan driver control signal CPV having the first logic value, may allow the scan lines S0 to Sq−1 to receive scan signals and in response to the scan driver control signal CPV having the second logic value, may prevent the scan lines Sq to Sm from receiving scan signals. The scan driver control signal CPV may be generated based on a scan supply signal SS, a reset signal Reset, or a scan index signal Sindex. In a exemplary embodiment, if the scan supply signal SS has a first logic value for one frame period, the scan driver control signal CPV has the first logic value for a part of the one frame period. For the part of the frame period, the scan lines S0 to Sq−1 may receive scan signals. The scan driver control signal CPV may have the second logic value in the remaining time of the one frame period. For the remaining time of the one frame period, the scan lines Sq to Sm need not receive scan signals. The one frame period may be referred to as a first type frame period.

If the scan supply signal SS has a second logic value different from the first logic value for one frame period, the scan driver control signal CPV may have the first logic value for the one frame period. In this case, the scan lines S0 to Sm may receive scan signals. The one frame period may be referred to as a second type frame period.

In an exemplary embodiment, if logic values of the reset signal Reset and the polarity signal POL are different in one frame period, the one frame period may be determined as the first type frame period during which the scan driver control signal CPV may have the logic values to allows the scan lines S0 to Sq−1 to receive scan signals and prevent the scan lines Sq to Sm from receiving scan signals, as described above with reference to the scan supply signal SS. If the logic values of the reset signal Reset and the polarity signal POL are equal in one frame period, the one frame period may be determined as the second type frame period during which the scan driver control signal CPV may have the logic value to allow the scan lines S0 to Sm to receive scan signals, as described above with reference to scan supply signal SS.

The timing controller 220 includes a scan signal supply controller 221. The scan signal supply controller 221 may generate the scan supply signal SS, the reset signal Reset, or the scan index signal Sindex. In an exemplary embodiment illustrated with reference to FIG. 1, the scan index signal Sindex may be 0 to q−1. In FIG. 1, it is illustrated that the scan supply signal SS, the reset signal Reset, and the scan index signal Sindex are generated by the scan signal supply controller 221. However, the scan supply signal SS, the reset signal Reset, and the scan index signal Sindex may be generated by the timing controller 220. According to an exemplary embodiment, the scan driver control signal CPV may include an even scan driver control signal (not shown) for controlling whether scan signals are to be supplied to even scan lines and an odd scan driver control signal (not shown) for controlling whether scan signals are to be supplied to odd scan lines. The scan signal supply controller 221 may include a counter detecting a falling edge or a rising edge and generate a reset signal Reset and a scan supply signal SS on the basis of a clock shared in the timing controller 220. In addition, the scan signal supply controller 221 may include a lookup table to output a scan index signal Sindex when an aspect ratio is input.

The data driver 230 latches image data RGB received from the timing controller 220 in response to the data timing control signal DCS. The data driver 230 may include a plurality of source driver integrated circuits (ICs) and supplies data voltages based on the image data RGB and the polarity signal POL to the data lines D. When the data line D0 is taken as an example, in the case where polarity of the data voltage corresponding to the data line D0 is positive polarity, a level of a common voltage is 1V, and a voltage level corresponding to a grayscale level of the data line D0 is 2V, a level of the data voltage supplied to the data line D0 is determined as 3V (1V+2V).

The scan driver 240 supplies scan signals to scan lines corresponding to the scan driver control signal CPV having the first logic value in response to the scan timing control signal SCS every frame. For the first type frame period, the scan signals are supplied only to the scan lines S0 to Sq−1. For the second type frame period, the scan signals are supplied to all scan lines S0 to Sm of the display panel 200.

Figure 2:
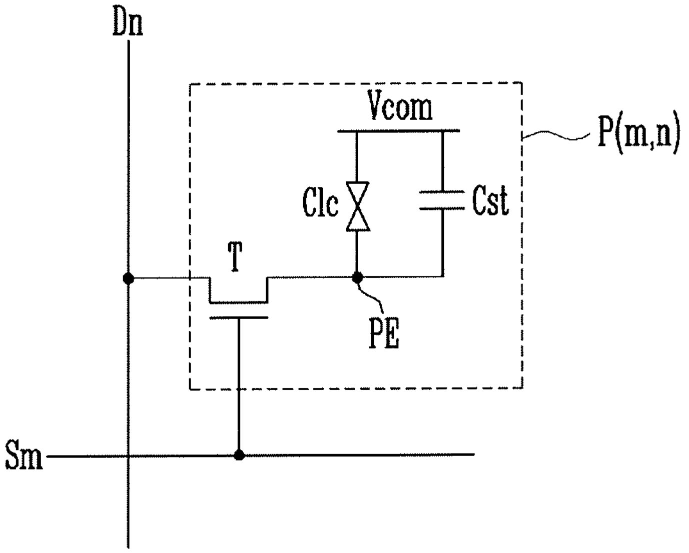
FIG. 2 shows an exemplary embodiment of a pixel of the liquid crystal display device of FIG. 1.

FIG. 2 shows an exemplary embodiment of a pixel in the liquid crystal display device of FIG. 1. In FIG. 2, for the convenience of description, the pixel P(m,n) electrically connected to the scan line Sm and the data line Dn is illustrated. Referring to FIG. 2, the pixel P(m,n) includes a transistor T, a liquid crystal cell Clc, a storage capacitor Cst, and a pixel electrode PE.

The transistor T is arranged between the data line Dn and the pixel electrode PE and a gate electrode thereof is connected to the scan line Sm. The liquid crystal cell Clc is driven by a voltage difference between the pixel electrode PE and a common electrode Vcom. The storage capacitor Cst is arranged between the common electrode Vcom and the pixel electrode PE and maintains the voltage difference between the pixel electrode PE and the common electrode Vcom for a predetermined period. When a level of a data voltage supplied to the data line Dn is higher than a level of a voltage supplied to the common electrode Vcom, polarity of the data voltage is defined as positive polarity. When a level of a data voltage supplied to the data line Dn is lower than a level of a voltage supplied to the common electrode Vcom, polarity of the data voltage is defined as negative polarity.

When an image is not displayed in a partial region (the second region 100-2) of the display panel 100, to reduce power consumption, scan signals need not be continuously supplied to scan lines corresponding to the partial region for a much longer period (for example, several seconds) than a one frame period. However, in this case, since the data voltage is not supplied for a much longer period than the one frame period, a voltage level of the pixel electrode PE may sufficiently approach a voltage level of ground. When the voltage level of the common electrode Vcom is a specific level (for example, 5V to 6V) higher than the voltage level of the ground and the liquid crystal display device is in a normal black mode, since the scan signals are not supplied for several seconds, a black grayscale may not be correctly displayed and light may be emitted. Scan signals may be supplied only to scan lines that do not correspond to the partial region in some of a plurality of frame periods. In addition, although the black grayscale is displayed, when the data voltage maintains one of the positive polarity and the negative polarity for several seconds, picture quality of a displayed image may be distorted. Therefore, the polarity of the data voltage may change in units of a uniform period (for example, less than one second).

Figure 3:
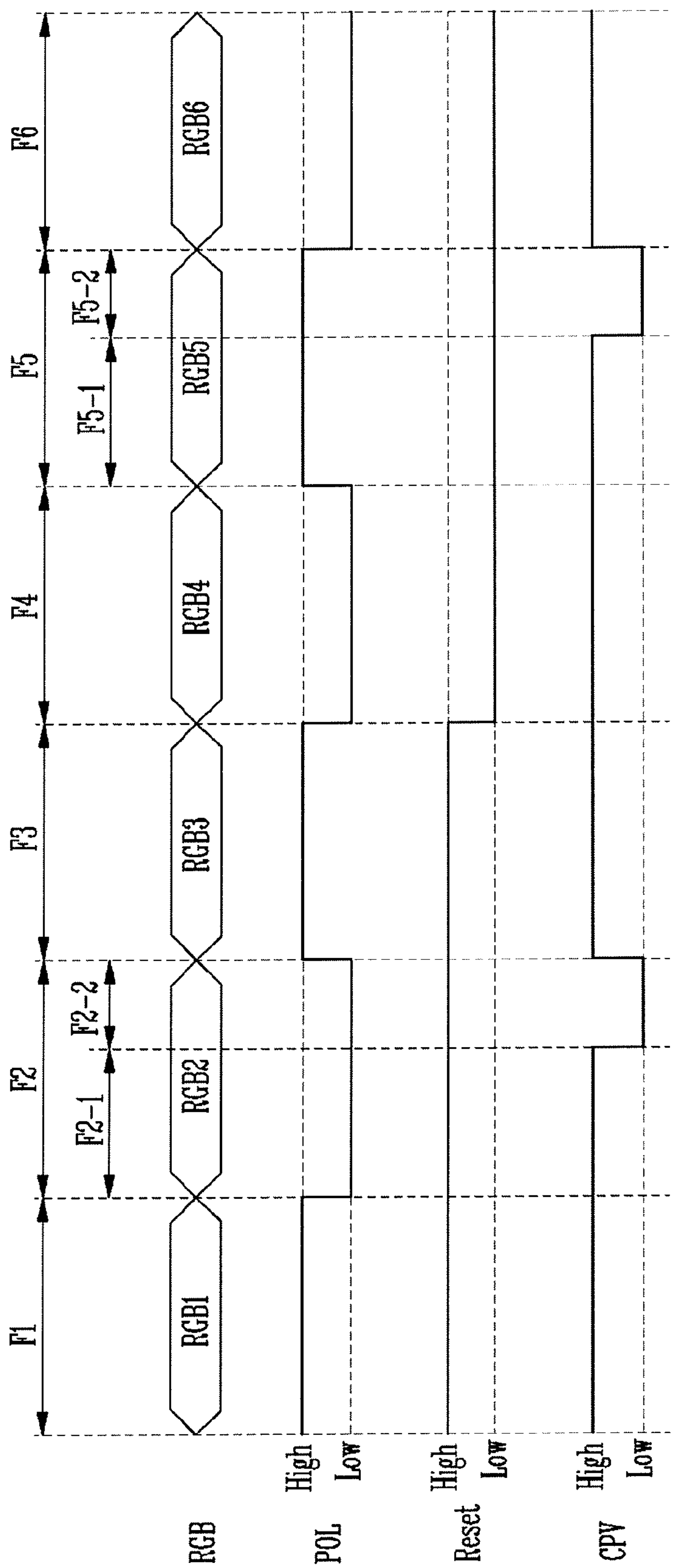
FIG. 3 shows scan signals, a polarity signal, and a reset signal that are generated or supplied by an exemplary embodiment of the liquid crystal display device of FIG. 1.

FIG. 3 shows scan signals, a polarity signal, and a reset signal that are generated or supplied by an exemplary embodiment of the liquid crystal display device of FIG. 1.

In an exemplary embodiment, the scan drive control signal CPV may be generated based on the polarity signal POL and the reset signal Reset, and the scan driver control signal CPV in first to sixth frame periods F1 to F6 will be described.

Logic values of the polarity signal POL and the reset signal Reset do not change in each frame period (one of F1 to F6). The polarity signal POL has a first logic value in the first frame period F1, the third frame period F3, and the fifth frame period F5 and has a second logic value different from the first logic value in the second frame period F2, the fourth frame period F4, and the sixth frame period F6. The reset signal Reset has a first logic value in the first to third frame periods F1 to F3 and has a second logic value in the fourth to sixth frame periods F4 to F6. In FIG. 3, the case in which the polarity signal POL or the reset signal Reset has the first logic value is referred to as a high level and the case in which the polarity signal POL or the reset signal Reset has the second logic value is referred to as a low level. However, the present invention is not limited thereto. The image signals RGB include first to sixth image signals RGB1 to RGB6.

Since the scan lines S0 to Sq−1 are included in the first region 100-1, an image is displayed. On the other hand, since the scan lines Sq to Sm are included in the second region 100-2, an image is not displayed. The second frame period F2 and the fifth frame period F5 in which the logic values of the polarity signal POL and the reset signal Reset are different from each other are included in some frame periods or determined as the first type frame period. Therefore, in periods F2-1 and F5-1 corresponding to the first region 100-1 in the second frame period F2 and the fifth frame period F5, the scan driver control signal CPV has a first logic value and, in periods F2-2 and F5-2 corresponding to the second region 100-2 in the second frame period F2 and the fifth frame period F5, the scan driver control signal CPV has a second logic value. In the second frame period F2 and the fifth frame period F5, the scan signals are supplied only to the scan lines S0 to Sq−1 that do not correspond to the second region 100-2. On the other hand, the third frame period F3, the fourth frame period F4, and the sixth frame period F6 in which the logic values of the polarity signal POL and the reset signal Reset are equal to each other are included in the other frame periods or determined as the second type frame period. In the first frame period F1, the third frame period F3, the fourth frame period F4, and the sixth frame period F6, since the scan driver control signal CPV has the first logic value, the scan signals are supplied to all the scan lines S. Logic values of the polarity signal POL and the reset signal Reset in a seventh frame period (not shown), which are displayed after the sixth frame period F6, are equal to the logic values of the polarity signal POL and the reset signal Reset in the first frame period F1. For example, logic values of the polarity signal POL and the reset signal Reset in an rth (r is a natural number) frame period may be equal to logic values of the polarity signal POL and the reset signal Reset in an (r+6)th frame period.

Even in the pixel (for example, P(m,n)) included in the second region 100-2, in the first frame period F1, the third frame period F3, the fourth frame period F4, and the sixth frame period F6, the scan signal is supplied to the scan line Sm. When the display panel 100 is driven in 60 Hz, since one frame is 16.6 ms, the voltage level of the pixel electrode PE may not sufficiently approach the voltage level of the ground. Even when the voltage level of the common electrode Vcom is the specific level (for example, 5V to 6V) higher than the voltage level of the ground and the liquid crystal display device is in the normally black method, the black grayscale may be correctly displayed.

The voltage level of the pixel electrode PE of the pixel (for example, P(m,n)) included in the second region 100-2 may be higher than the voltage level of the common electrode Vcom in the first to third frame periods F1 to F3 and may be lower than the voltage level of the common electrode Vcom in the fourth to sixth frame periods F4 to F6. When the polarity of the data voltage changes in units of three frame periods and the display panel 100 is driven in 60 Hz, the first type frame period occurs at three frame periods or about 50 milliseconds (three times 16.6 milliseconds), and thus the picture quality of the image displayed on the display panel 100 is not distorted.

Figure 4:
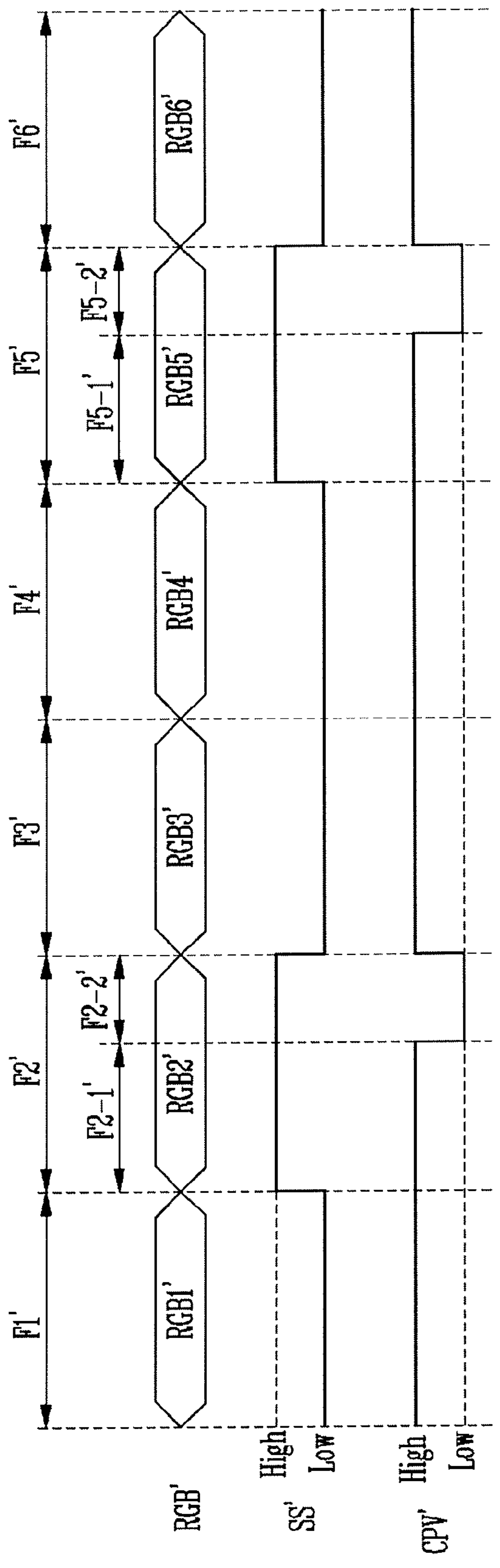
FIG. 4 shows scan signals and a scan supply signal that are generated or supplied by an exemplary embodiment of the liquid crystal display device of FIG. 1.

FIG. 4 shows scan signals and a scan supply signal that are generated or supplied by an exemplary embodiment of the liquid crystal display device of FIG. 1.

In an exemplary embodiment, the scan control signal CPV' is generated based on only a scan supply signal SS', and a scan driver control signal CPV' in first to sixth frame periods F1' to F6' will be described.

A logic value of the scan supply signal SS' does not change in each frame period (one of F1' to F6'). The scan supply signal SS' has a first logic value in the second frame period F2' and the fifth frame period F5' and has a second logic value different from the first logic value in the first frame period F1', the third frame period F3', the fourth frame period F4', and the sixth frame period F6'. In FIG. 4, the case in which the scan supply signal SS' has the first logic value is referred to as a high level and the case in which the scan supply signal SS' has the second logic value is referred to as a low level. However, the present invention is not limited thereto. Image signals RGB' include first to sixth image signals RGB1' to RGB6'.

Since the scan lines S0 to Sq−1 are included in the first region 100-1, an image is displayed. On the other hand, since the scan lines Sq to Sm are included in the second region 100-2, an image is not displayed. The second frame period F2' and the fifth frame period F5' in which the scan supply signal SS' has the first logic value are included in some frame periods or determined as the first type frame period. Therefore, in periods F2-1' and F5-1' corresponding to the first region 100-1 in the second frame period F2' and the fifth frame period F5', the scan driver control signal CPV' has a first logic value and, in periods F2-2' and F5-2' corresponding to the second region 100-2 in the second frame period F2' and the fifth frame period F5', the scan driver control signal CPV' has a second logic value. In the second frame period F2' and the fifth frame period F5', the scan signals are supplied only to the scan lines S0 to Sq−1 that do not correspond to the second region 100-2. On the other hand, the first frame period F1', the third frame period F3', the fourth frame period F4', and the sixth frame period F6' in which the scan supply signal SS' has the second logic value are included in the other frame periods or determined as the second type frame period, and the scan driver control signal CPV' has the first logic value. In the first frame period F1', the third frame period F3', the fourth frame period F4', and the sixth frame period F6', the scan signals are supplied to all the scan lines S0 to Sm. A logic value of the scan supply signal SS' in a seventh frame period (not shown), which is displayed after the sixth frame period F6', is equal to the logic value of the scan supply signal SS' in the first frame period F1'. For example, a logic value of the scan supply signal SS' in the rth (r is a natural number) frame period may be equal to a logic value of the scan supply signal SS' in an (r+6)th frame period.

Even in the pixel (for example, P(m,n)) included in the second region 100-2, in the first frame period F1', the third frame period F3', the fourth frame period F4', and the sixth frame period F6', the scan signal is supplied to the scan line Sm, advantages of which were previously described.

Figure 5:
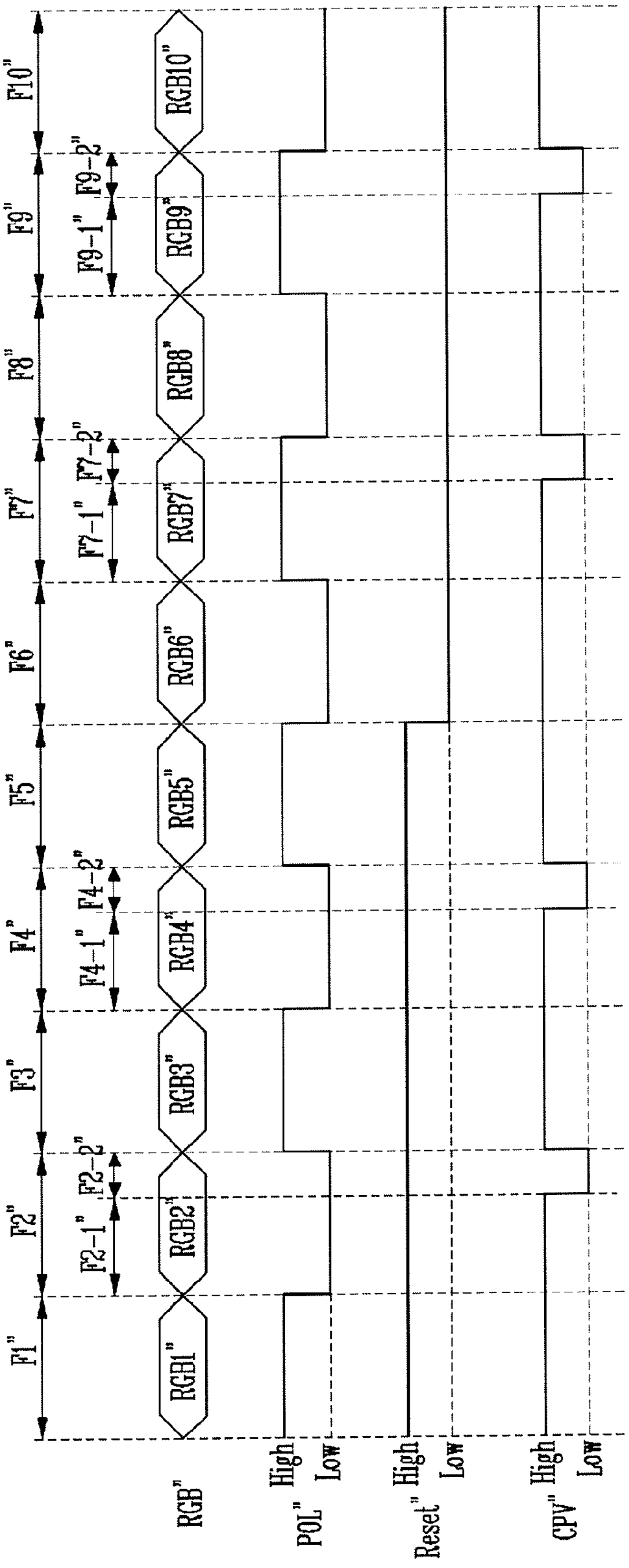
FIG. 5 shows scan signals and a scan supply signal that are generated or supplied by an exemplary embodiment of the liquid crystal display device of FIG. 1.

FIG. 5 shows scan signals and a scan supply signal that are generated or supplied by an exemplary embodiment of the liquid crystal display device of FIG. 1.

For the convenience of description, a scan driver control signal CPV" may be generated based on a polarity signal POL" and a reset signal Reset", and a scan driver control signal CPV" in first to tenth frame periods F1" to F10" will be described.

Logic values of the polarity signal POL" and the reset signal Reset" do not change in each frame period (one of F1" to F10"). The polarity signal POL" has a first logic value in the first frame period F1", the third frame period F3", the fifth frame period F5", the seventh frame period F7", and the ninth frame period F9" and has a second logic value different from the first logic value in the second frame period F2", the fourth frame period F4", the sixth frame period F6", the eighth frame period F8", and the tenth frame period F10". The polarity of the data voltage may be the positive polarity while the polarity signal POL" has the first logic value and may be the negative polarity while the polarity signal POL" has the second logic value. The reset signal Reset" has a first logic value in the first to fifth frame periods F1" to F5" and has a second logic value in the sixth to tenth frame periods F6" to F10". In FIG. 5, the case in which the polarity signal POL" or the reset signal Reset" has the first logic value is referred to as a high level and the case in which the polarity signal POL" or the reset signal Reset" has the second logic value is referred to as a low level. However, the present invention is not limited thereto. Image signals RGB" include first to tenth image signals RGB1" to RGB10".

The second frame period F2", the fourth frame period F4", the seventh frame period F7", and the ninth frame period F9" in which the logic values of the polarity signal POL" and the reset signal Reset" are different from each other, and the second frame period F2", the fourth frame period F4", the seventh frame period F7", and the ninth frame period F9" are included in some frame periods or determined as the first type frame period. Therefore, in periods F2-1", F4-1", F7-1", and F9-1" corresponding to the first region 100-1 in the second frame period F2", the fourth frame period F4", the seventh frame period F7", and the ninth frame period F9", the scan driver control signal CPV" has the first logic value and, in periods F2-2", F4-2", F7-2", and F9-2" corresponding to the second region 100-2 in the second frame period F2", the fourth frame period F4", the seventh frame period F7", and the ninth frame period F9", the scan driver control signal CPV" has the second logic value. In the second frame period F2", the fourth frame period F4", the seventh frame period F7", and the ninth frame period F9", the scan signals are supplied only to the scan lines S0 to Sq−1 that do not correspond to the second region 100-2. On the other hand, the first frame period F1", the third frame period F3", the fifth frame period F5", the sixth frame period F6", the eight frame period F8", and the tenth frame period F10" in which the logic values of the polarity signal POL" and the reset signal Reset" are equal to each other are included in the other frame periods or determined as the second type frame period, and the scan driver control signal CPV" has the first logic value and the scan signals are supplied to all the scan lines S0 to Sm. Logic values of the polarity signal POL" and the reset signal Reset" in an $11^{th}$ frame period (not shown), which are displayed after the tenth frame period F10", are equal to the logic values of the polarity signal POL" and the reset signal Reset" in the first frame period F1". For example, logic values of the polarity signal POL" and the reset signal Reset" in the rth frame period may be equal to logic values of the polarity signal POL" and the reset signal Reset" in an (r+10)th frame period.

Even in the pixel (for example, P(m,n)) included in the second region 100-2, in the first frame period F1", the third frame period F3", the fifth frame period F5", the sixth frame period F6", the eight frame period F8", and the tenth frame period F10", the scan signal is supplied to the scan line Sm, advantages of which were previously described.

The voltage level of the pixel electrode PE of the pixel (for example, P(m,n)) included in the second region 100-2 may be higher than the voltage level of the common electrode Vcom in the first to fifth frame periods F1" to F5" and may be lower than the voltage level of the common electrode Vcom in the sixth to tenth frame periods F6" to F10". When the reset signal Reset changes in units of five frame periods and the display panel 100 is driven in 60 Hz, the first type frame period occurs at two frame periods or about 33 milliseconds (two times 16.6 milliseconds), and thus the picture quality of the image displayed on the display panel 100 is not distorted.

Figure 6:
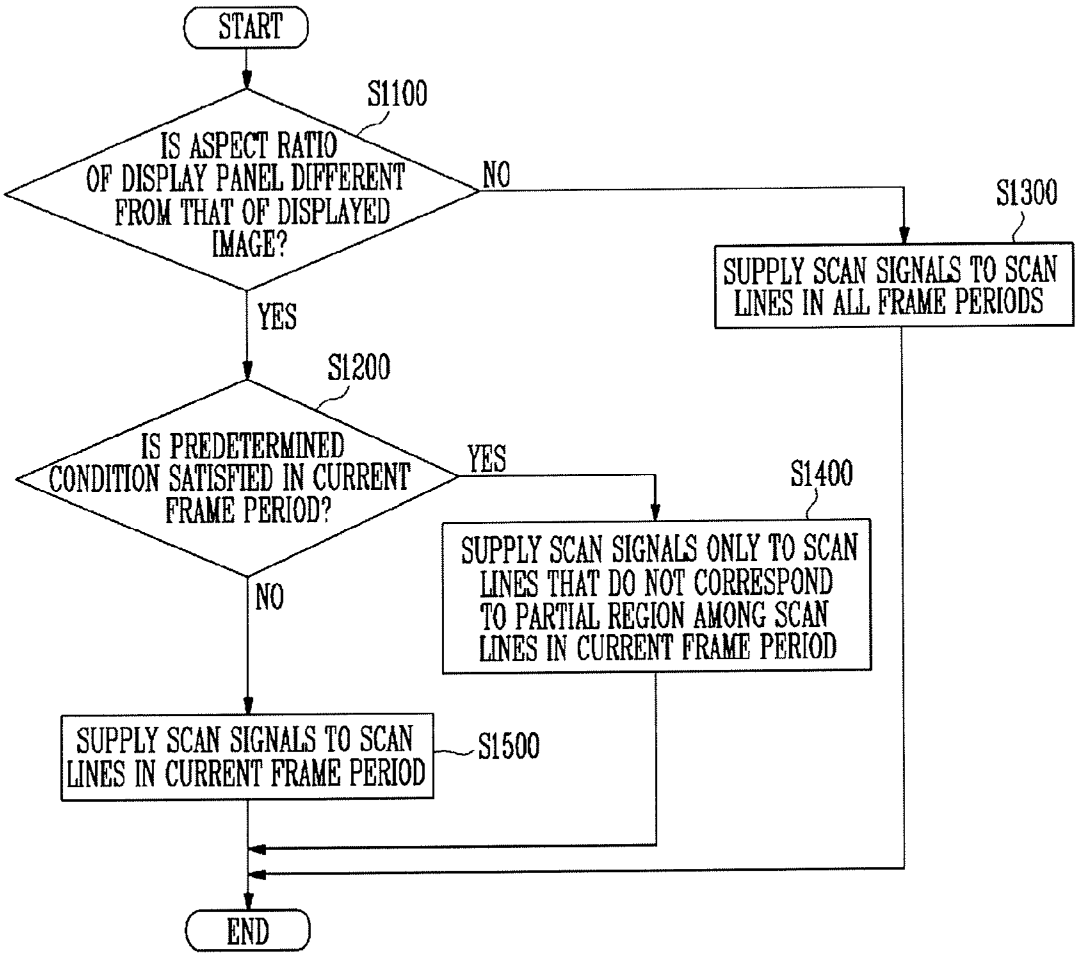
FIG. 6 shows a method of driving a liquid crystal display device according to an exemplary embodiment of the present invention.

FIG. 6 shows a method of driving a liquid crystal display device according to an exemplary embodiment of the present invention. The method of driving a liquid crystal display device will be described with reference to FIGS. 1 to 6.

In operation S1100, an aspect ratio of a display panel is compared with that of a displayed image. When it is determined in the operation S1100 that the aspect ratio of the display panel is different from that of the displayed image, operation S1200 is performed. The operation of S1200, S1400 and S1500 may be collectively as a partial mode in which an image will be displayed on a partial region of a display panel. When it is determined in the operation S1100 that the aspect ratio of the display panel is the same as that of the displayed image, operation S1300 is performed. The operation of S130 may be referred to as a full screen mode. The aspect ratio of the displayed image may be determined by the outside (not shown).

In the operation S1200, it is determined whether a current frame period satisfies a predetermined condition. When it is determined in the operation S1200 that the predetermined condition is satisfied, operation S1400 is performed. When it is determined in the operation S1200 that the predetermined condition is not satisfied, operation S1500 is performed. The operation S1200 will be described in detail with reference to FIG. 7 or 8.

In the operation S1300, scan signals are supplied to scan lines S regardless of a frame period. For example, a scan driver control signal CPV has a first logic value and the scan signals are supplied to the scan lines S in all the frame periods.

In the operation S1400, scan signals are supplied only to scan lines S0 to Sq−1 that do not correspond to a partial region among scan lines. For the convenience of description, FIG. 3 is referred to again and it may be assumed that the current frame period is a second frame period F2. In a period F2-1 corresponding to a first region 100-1 in the second frame period F2, the scan driver control signal CPV has the first logic value. In a period F2-2 corresponding to a second region 100-2 in the second frame period F2, the scan driver control signal CPV has a second logic value. Therefore, scan signals are not supplied to scan lines Sq to Sm corresponding to the partial region and scan signals are supplied only to remaining scan lines S0 to Sq−1.

In the operation S1500, the scan signals are supplied to the scan lines S. For the convenience of description, FIG. 3 is referred to again and it may be assumed that the current frame period is a first frame period F1. Since the scan driver control signal CPV has the first logic value in the first frame period F1, the scan signals are supplied to the scan lines S.

Figure 7:
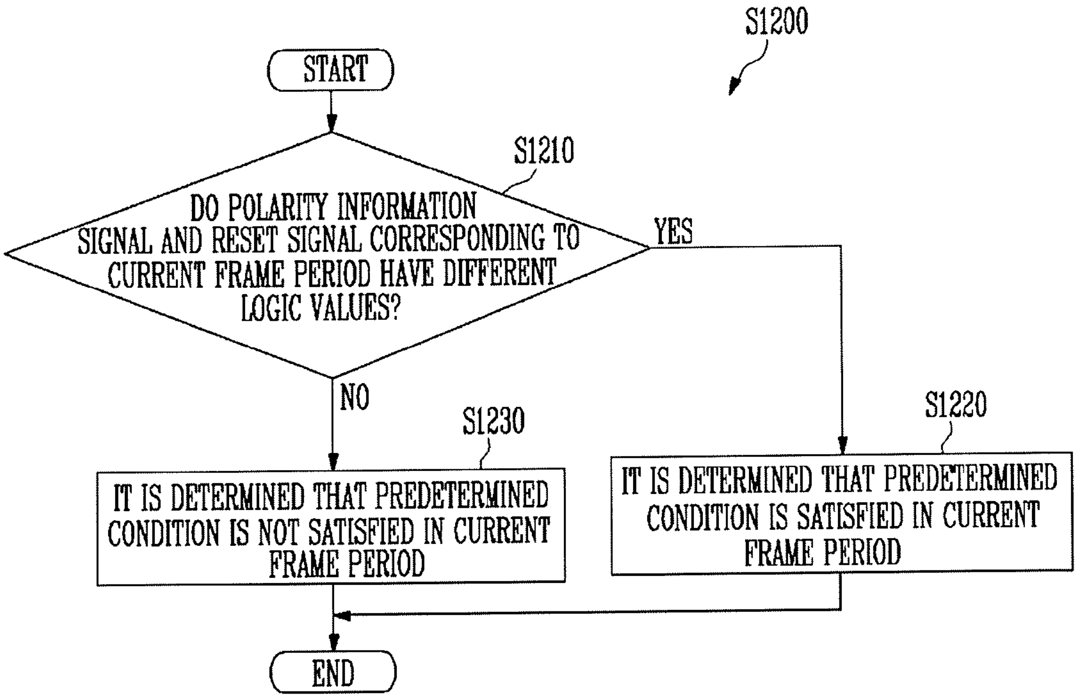
FIG. 7 shows a process of determining whether a current frame period satisfies a predetermined condition of FIG. 6 according to an exemplary embodiment of the present invention.

FIG. 7 shows a process of determining whether a current frame period satisfies a predetermined condition in the method of driving a liquid crystal display device of FIG. 6 according to an exemplary embodiment. Hereinafter, the operation S1200 will be described with reference to FIGS. 1, 2, 3, 6, and 7.

In S1210, logic values of a polarity signal POL and a reset signal Reset are compared with each other. When the logic values of the polarity signal POL and the reset signal Reset are different from each other, operation S1220 is performed. When the logic values of the polarity signal POL and the reset signal Reset are equal to each other, operation S1230 is performed.

In the operation 1220, it is determined that the current frame period satisfies the predetermined condition.

In the operation S1230, it is determined that the current frame period does not satisfy the predetermined condition.

Figure 8:
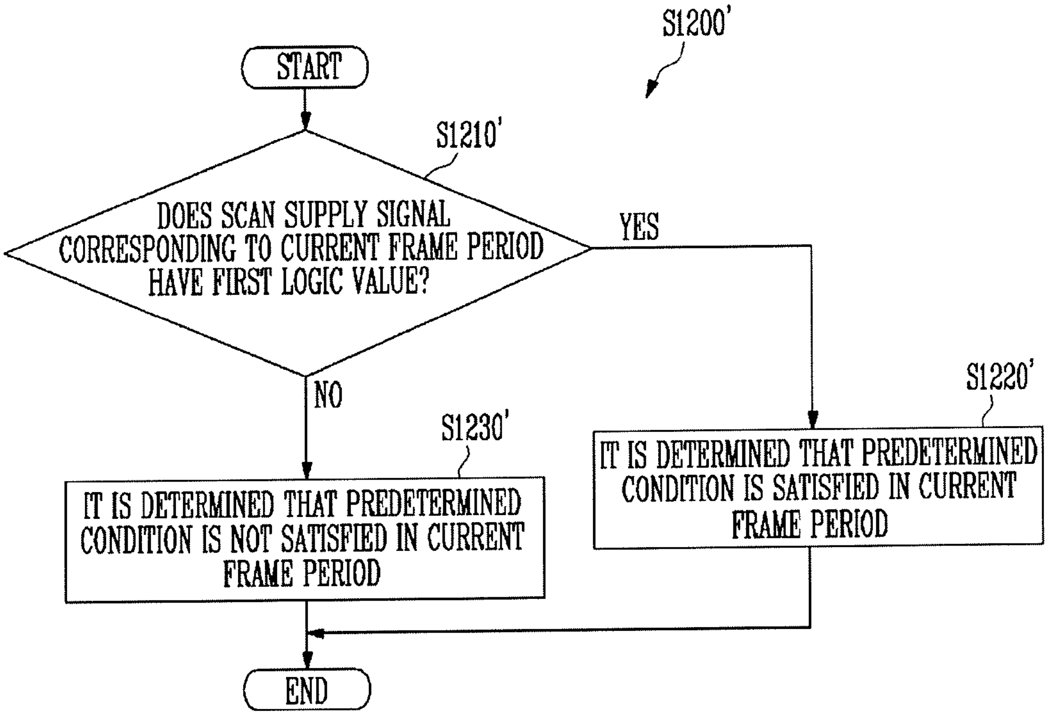
FIG. 8 shows a process of determining whether a current frame period satisfies a predetermined condition in the method of FIG. 6 according to an exemplary embodiment of the present invention.

FIG. 8 shows a process of determining whether a current frame period satisfies a predetermined condition in the method of driving a liquid crystal display device of FIG. 6 according to an exemplary embodiment. Hereinafter, operation S1200' will be described with reference to FIGS. 1, 2, 4, 6, and 8.

In S1210', a logic value of a scan supply signal SS' is determined. When the scan supply signal SS' has a first logic value, operation S1220' is performed. When the scan supply signal SS' has a second logic value different from the first logic value, operation S1230' is performed.

In the operation 1220', it is determined that the current frame period satisfies the predetermined condition.

In the operation S1230', it is determined that the current frame period does not satisfy the predetermined condition.

While the present invention has been shown and described with reference to exemplary embodiments thereof, it will be apparent to those of ordinary skill in the art that various changes in form and detail may be made therein without departing from the spirit and scope of the present invention as defined by the following claims.

What is claimed is:

1. A liquid crystal display device comprising:

a display panel having a first aspect ratio including a plurality of pixels, a plurality of scan lines and a plurality of data lines, wherein the pixels are arranged at intersections of the scanning lines and the data lines; and a display panel driver configured, in a partial mode in which an image having a second aspect ratio different from the first aspect ratio is displayed on a partial region of the display panel for two or more frame periods, to:

supply scan signals only to a first number of scan lines electrically connected to pixels of the partial region for a first type frame period of the two or more frame periods, and supply scan signals to the plurality of scan lines for a second type frame period of the two or more frame periods;

wherein the display driver generates a polarity signal and a reset signal of which logic values are constant within each frame period of the two or more frame periods, and wherein the display driver determines, if logic values of the polarity signal and the reset signal of a frame period are different, the frame period as the first type frame period and determines, if logic values of the polarity signal and the reset signal of a frame period is the same, the frame period as the second type frame period.

2. The liquid crystal display device of claim 1, wherein the display driver is configured to change logic values of the polarity signal at a first period, wherein the display driver is configured to change logic values of the reset signal at a second period which is greater than the first period.

3. The liquid crystal display device of claim 2, wherein the display driver is configured to generate a scan driver control signal based on the logic values of the polarity signal and the reset signal, wherein the display driver includes a scan driver, in response to the scan driver control signal, driving the first number of scan lines for the first type frame period and the plurality of scan lines for the second type frame period, and wherein the first number of scan lines is smaller than a number of the plurality of scan lines.

4. The liquid crystal display device of claim 1, wherein the display driver generates a scan supply signal having a first logic value and a second logic value and oscillating at a first period therebetween, wherein the displayer driver is configured to determine, if a logic value of the scan supply signal for a frame period is the first logic value, the frame period as the first type frame period, and to determine, if a logic value of the scan supply signal for a frame period is the second logic value, the frame period as the second type frame period.

5. The liquid crystal display device of claim 4, wherein the display driver is configured to generate a scan driver control signal based on the scan supply signal, wherein the display driver includes a scan driver, in response to the scan driver control signal, driving the first number of scan lines for the first type frame period and the plurality of scan lines for the second type frame period, and wherein the first number of scan lines is smaller than a number of the plurality of scan lines.

6. A method of driving a liquid crystal display device including a display panel including a plurality of pixels, a plurality of scan lines and a plurality of data lines electrically connected to the pixels, the method comprising:

determining whether an image to be displayed has an aspect ratio different from an aspect ratio of the display panel;

if the aspect ratio of the image is determined as different from that of the display panel, displaying the image in a partial mode where scan signals are supplied only to scan lines of a partial region in the display panel for a first type frame period and scan signals are supplied to the plurality of scan lines for a second type frame period; and if the aspect ratio of the image is determined as the same as that of the display panel, displaying the image in a full screen mode where scan signals are supplied to the plurality of scan lines;

wherein the first type frame period is a period of which a polarity signal and a reset signal have different logic values and the second type frame period is a period of which the polarity signal and the reset signal have the same logic values.

7. The method of claim 6, further comprising: generating a scan control signal based on the polarity signal and the reset signal to control supplying scan signals to the plurality of scan lines, wherein the scan control signal has a first waveform for the first type frame period and a second waveform for the second type frame period.

8. The method of claim 7, wherein the first waveform is formed of a first logic value and a second logic value and the second waveform is formed only of the first logic value, and wherein the scan signals are supplied to the plurality of scan signals when the scan control signal is at the first logic value and the scan signals are supplied only to the first number of scan lines when the scan control signal is at the second logic value.

9. The method of claim 6, wherein the first type frame period is a period of which a scan supply signal has a first logic value, and the second type frame period is a period of which the scan supply signal has a second logic value.

10. The method of claim 9, further comprising:

generating a scan control signal based on a scan supply signal to control supplying scan signals to the plurality of scan lines, wherein the scan control signal has a first waveform for the first type frame period and a second waveform for the second type frame period.

11. The method of claim 10, wherein the first waveform is formed of a first logic value and a second logic value and the second waveform is formed only of the first logic value, and wherein the scan signals are supplied to the plurality of scan signals when the scan control signal is at the first logic value and the scan signals are supplied only to the first number of scan lines when the scan control signal is at the second logic value.

* * * * *